United States Patent [19]

Needham et al.

[11] 3,999,518
[45] Dec. 28, 1976

[54] MILKER SUPPORT

[75] Inventors: Lyle L. Needham, Bellwood; Harold V. Swanson, Downers Grove; Don W. Fitzpatrick, Naperville; James W. Kopec, Wheaton, all of Ill.

[73] Assignee: Babson Brothers Company, Oak Brook, Ill.

[22] Filed: May 12, 1975

[21] Appl. No.: 576,896

[52] U.S. Cl. .......................................... 119/14.13
[51] Int. Cl.² ........................................ A01J 7/00
[58] Field of Search ........... 119/14.08, 14.1, 14.13, 119/14.14

[56] References Cited
UNITED STATES PATENTS

| | | | |
|---|---|---|---|
| 3,246,631 | 4/1966 | Holm | 119/14.08 X |
| 3,870,021 | 3/1975 | Nederbragt | 119/14.13 |

*Primary Examiner*—Hugh R. Chamblee
*Attorney, Agent, or Firm*—Wegner, Stellman, McCord, Wiles & Wood

[57] ABSTRACT

A milker support including a support structure adapted to support a milking unit within a stall and which may be moved downwardly in small increments during a milking process to optimize the height of the milking unit relative to the cow as the cow is being milked out. A reciprocal motor mounts the support structure and manual controls for the motor are provided whereby the initial height of the support structure may be adjusted. An automatic control is operative to cause the motor to progressively drive the support structure, and thus the milking unit, downwardly during a milking process.

10 Claims, 2 Drawing Figures

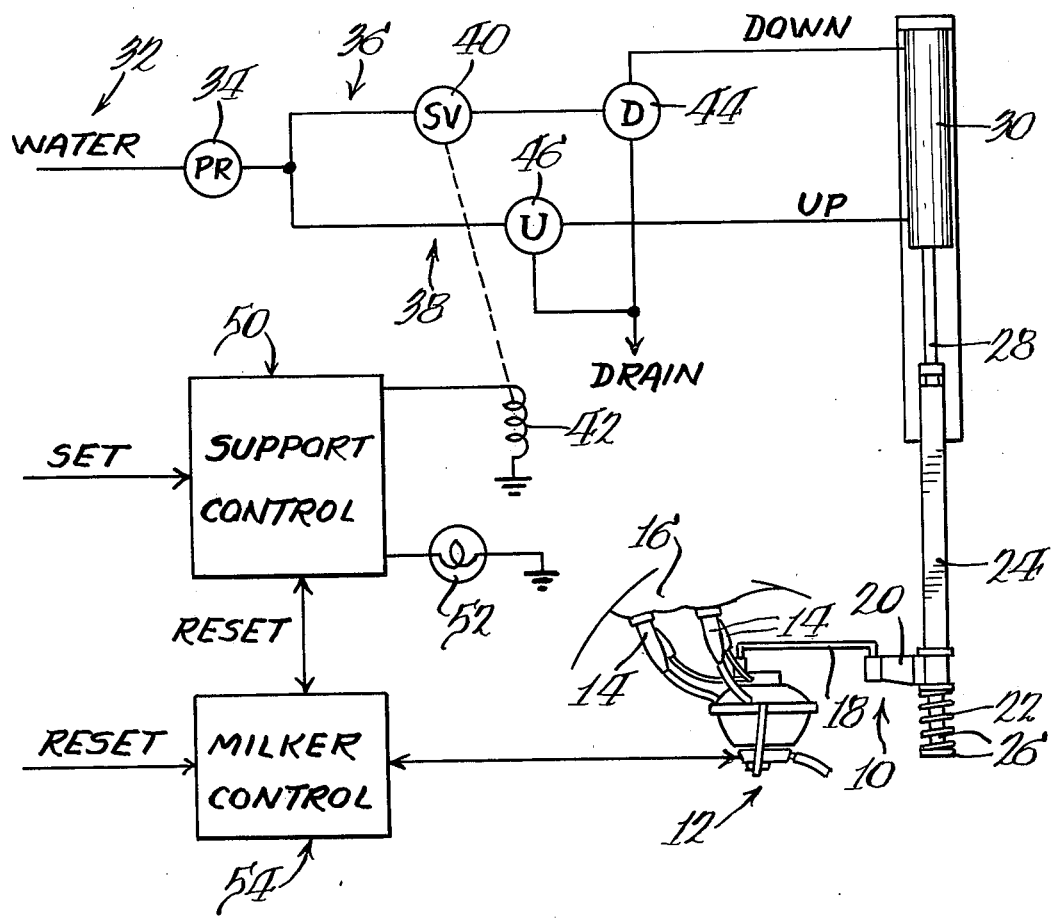

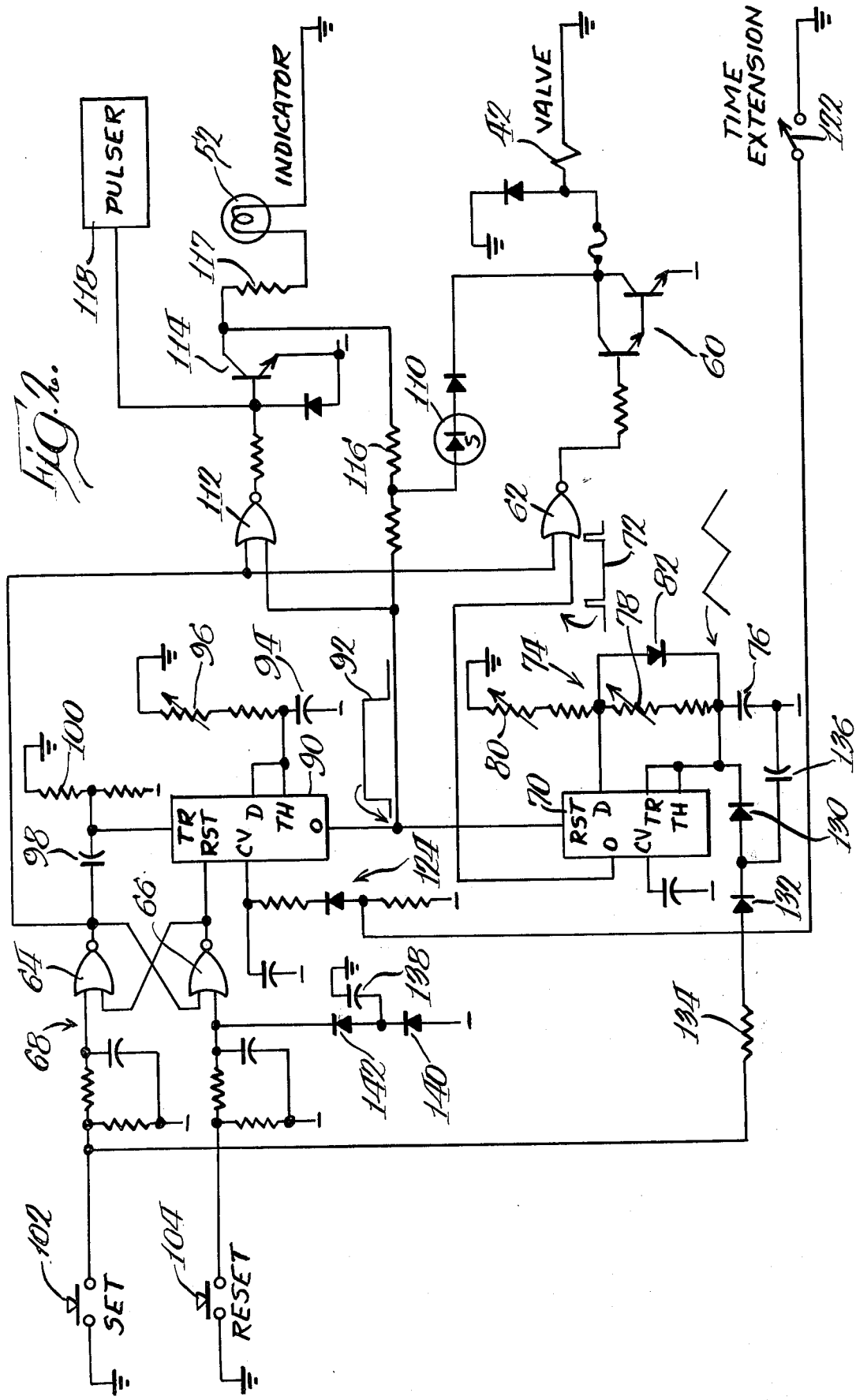

MILKER SUPPORT

BACKGROUND OF THE INVENTION

This invention relates to milking supports and, more particularly, milking supports for supporting a milking unit within a milking stall at a height that optimizes tug and pull throughout a milking operation.

Ever since the advent of the automatic milking machine, it has been recognized that the efficiency of an automatic milking operation depends upon optimizing "tug and pull" of the milking unit on the teats of a cow being milked. As a result of this recognition, there have been a variety of proposals of structures whereby the height of a milking unit may be easily adjusted to compensate for differences difference in elevation of the udders of various cows above the floor of the milking stall, biasing devices for biasing a milking unit in a particular direction relative to the cow's udder, etc.

Representative illustrations of structures for the foregoing purposes may be found in Thomas U.S. Pat. No. 3,624,739, and Thomas et al. U.S. Pat. No. 3,605,694, respectively, both of which are assigned to the assignee of the instant application.

While such structures work well for their intended purposes, and indeed, provide excellent results at relatively low equipment cost, because of their economical construction, they do not take full advantage of the fact that during a milking operation, as a cow becomes milked out, there is increasing slackness (or a decreasing tautness) in the cow's udder such that the optimum height of the unit for maximizing proper tug and pull progressively decreases during the milking operation.

SUMMARY OF THE INVENTION

It is the principal object of the invention to provide a new and improved milking support. More specifically, it is an object of the invention to provide a milking support which progressively lowers a milking unit during a milking operation so as to achieve, at all times during the milking operation, an optimal height relation of a unit relative to the cow's udder to obtain proper tug and pull throughout the milking operation to thereby maximize the efficiency of the milking operation.

The exemplary embodiment of the invention achieves the foregoing objects through a structure including a motor having a reciprocal output, such as a double acting, fluid actuated cylinder, having its output structure mounting a support which, in turn, may extend into a milking area and support therein a milking unit of an automatic milking machine.

A control is provided for the motor and includes a manually operable system whereby the support for the unit may be raised or lowered at the beginning of a milking operation to initially place the unit at the optimal height for a given cow. In the preferred embodiment, manually operated valve means in fluid communication with the fluid actuated cylinder are employed for this purpose.

The control also includes an automatic control circuit which is operable to cause the motor to lower the support, and thus the unit thereon, progressively during the milking operation to compensate for the increasing lack of tautness in the cow's udder as the cow is milked out. In the preferred embodiment, an electrically operated valve is employed along with a river for the same. The driver, in turn, is actuated by a pulse generator which causes the driver to open the valve for short intervals at predetermined time periods to, for example, move the support downwardly a fraction of an inch every 20–30 seconds.

An envelope timer is employed for setting the length of a milking operation along with a means for initiating operation of the envelope timer. During the period of the envelope generated by the envelope timer, the aforementioned pulse generator is operative.

Preferably, the system includes a manually and selectively operable device which may be operated during the milking operation for causing the envelope timer to extend the setting of the length of the milking operation then in progress to enable the system to be easily used with cows having exceptionally large udders.

In a highly preferred embodiment, the pulse generator comprises an electronic circuit including an RC system having a first adjustable resistor component for setting the interval between the pulses and a second adjustable resistor component for setting the pulse width. As a consequence, the interval between stepwise downward increments of movement of the support can be varied as well as the distance of downward movement during motor energization.

In addition, the RC system includes a timing capacitor along with a further capacitor in series with a diode connected across the timing capacitor. Means for initiating operation of the envelope timer includes a momentarily operable switch connected through a current-limiting resistor and isolation diode to the second capacitor. Thus, when the switch is momentarily operated to initiate operation of the envelope timer, both of the capacitors will be enlarged to initialize the RC system, and thus the pulse generator. Furthermore, the second capacitor acts to delay generation of the first pulse by the pulse generator to allow a milking operation to achieve a steady state condition before the progressive lowering of the support is initiated.

Other objects and advantages of the invention will become apparent from the following specification taken in connection with the accompanying drawings.

DESCRIPTION OF THE DRAWINGS

FIG. 1 is a somewhat schematic view of a milker support made according to the invention and showing various controls in block form; and FIG. 2 is a more detailed schematic of a control system for the milker support.

DESCRIPTION OF THE PREFERRED EMBODIMENTS

An exemplary embodiment of the invention is illustrated somewhat schematically in FIG. 1 and is seen to include a support structure, generally designated 10, which is adapted to be located within a milking stall or the like for purposes of supporting a milking unit, generally designated 12 therein, such that teat cups 14 thereof may be located on the teats of a cow's udder 16.

The support structure 10 includes a first arm 18 pivotally mounted on a second arm 20 which may be biased in a particular direction by a spring 22. In general, the arrangement of the arms 18 and 20 and the spring 22 may be along the lines described in the above identified Thomas et al. U.S. Pat. No. 3,605,694.

The arm 20 is pivotally secured on the lower end of a movable upright member 24 which may be slidable on a vertically oriented shaft 26 in the vertical direction so as to alter the height of the unit 12 relative to the cow's udder 16. The upper end of the upright 24 is connected to the rod 28 of a double acting, fluid actuated cylinder 30 such that, depending upon the direction of actuation of the cylinder 30, the arms 18 and 20 will be moved upwardly or downwardly.

Fluid under pressure is supplied to the cylinder 30 from a source of fluid under pressure. In the preferred embodiment, a water system, generally designated 32, is provided. Water from the source 32 is fed through a pressure regulator 34 to branches, generally designated 36 and 38, of a system connected to the cylinder 30. The branch 36 includes an electrically operated, normally open solenoid valve 40 having a solenoid actuator 42 in series with a manually operated valve 44. The branch 36 is connected to the upper end of the cylinder 30 so that when fluid under pressure is applied to the cylinder therethrough, the support structure 10 will be moved downwardly.

The branch 38 is connected via a manually operable valve 46 to the lower end of the cylinder 30 such that when fluid is passed by the valve 46, the cylinder 30 will be energized to raise the support structure 10.

Both of the valves 44 and 46 include an outlet line 48 to drain. Depending upon the preferences of the user, the valves 44 and 46 may be individual or, in the alternative, may comprise a single valve movable through a variety of positions including one wherein fluid may pass through the branch 36, a second position wherein fluid may pass through the branch 38, and a third position wherein both branches 36 and 38 are closed.

It is also to be understood that, while the valve 40 is illustrated as being upstream of the valve 44 in the line 36, the same could be employed downstream thereof by reason of its normally open characteristic.

The system further includes a control circuit, generally designated 50, for the milker support to provide control signals for the solenoid 42 of the valve 40 and may be employed under circumstances to be described hereinafter to energize an indicator light 52. The system may optionally include a milker control, generally designated 54, of the type which senses the flow of milk from each quarter of a cow's udder during the milking process and which is operable to terminate the milking of the quarter when the same is milked out. Preferably, the milker control system 54 is that disclosed in the commonly assigned U.S. patent of Needham et al., U.S. Pat. No. 3,773,016, the details of which are herein incorporated by reference.

Turning now to FIG. 2, the construction of the support control 50 will be described in greater detail. In particular, the solenoid 42 of the valve 40 is connected to the output of an electronic driver 60 composed to two Darlington connected transistors controlled by the output of a gate 62. In general, the driver 60 will be energized during a milking operation, as will be seen, to energize the solenoid 42. As a consequence, the valve 40, even though normally open, will be closed during the majority of the milking operation. When it is desired to move the support downwardly an increment, the driver 60 will be deenergized by the output of the gate 62 to deenergize the solenoid 42 of the valve 40 to thereby allow the valve 40 to open until the gate 62 again turns the driver 60 on.

The gate 62, while shown as a NOR gate, acts as an inverting AND and includes one enabling input from the output of a gate 64 connected in a conventional fashion to a gate 66 to define a flip-flop, generally designated 68. The other input to the gate 62 is taken from the output terminal of a conventional integrated circuit timer, known as a type 555, available from a variety of sources. The timer is designated 70 and acts as a pulse generator delivering a pulse train 72 to the gate 62. The arrangement is such that for the positive going pulses of the pulse train 72, the driver 60 will be deenergized.

The width of the positive going pulses and the interval therebetween of the pulses 72 may be selectively varied through the use of an RC circuit, generally designated 72, connected to the various designated terminals of the timer 70. More particularly, the RC system 74 includes a principal timing capacitor 76 having one side connected to a negative source of power and its other side connected to a variable resistor such as a potentiometer 78. The potentiometer 78 includes one connection through a variable resistor, such as the potentiometer 80, to ground. A diode 82 is connected in shunt relation across the potentiometer 78 and to the timer 70 as follows: The anode of the diode 82 is connected to the discharge terminal of the timer 70, while the cathode of the diode 82 is connected to both trigger and threshold terminal of the timer 70.

As a result of the foregoing, it will be appreciated that through adjustment of the resistive branch, including the potentiometer 78, the interval between positive going pulses to the gate 62 may be selectively varied to thereby increase or decrease the length of time between each stepwise increment of downward movement of the support. Similarly, through appropriate adjustment of the resistive leg including the potentiometer 80, the width of the positive going pulses can be selectively varied to thereby increase or decrease the length of time that the valve 40 is open to cause each stepwise increment of movement, thereby increasing or decreasing the length of such movement.

The period during which the pulse generator defined by the timer 70 may operate is determined by the length of a positive going pulse to the reset terminal of the timer 70 from the output terminal of an identical timer 90. As illustrated at 92, the output terminal of the timer 90 provides a positive going pulse of envelope. The width of the envelope is determined by an RC circuit including a capacitor 94 and a potentiometer 96 connected, as illustrated, to the discharge and threshold terminals of the timer 90 and will generally be on the order of two to five minutes. The width can be selectively varied through appropriate manipulation of the potentiometer 96.

The envelope timer 90 is energized by a signal to its trigger terminal from the output of the gate 64 forming part of the flip-flop 68 as differentiated by a differentiator circuit including a capacitor 98 and a biasing resistive divider 100.

A further input to the timer 90 from the flip-flop 68 is generated by the gate 66 and is placed on the reset terminal of the time 90.

When the flip-flop 68 is set, a milking operation will be initiated and will continue until such time as the envelope timer 90 times out or until the flip-flop 68 is reset. The flip-flop 68 may be manually set by a momentarily operable switch 102 connected as an input to the gate 64 and may be reset through appropriate operation of a similar momentarily operable switch 104 connected as an input to the gate 66. When the invention is employed in connection with a milker control 54 (FIG. 1), as mentioned previously, the switch 104 will form a part thereof corresponding to the switch disclosed in the previously identified Needham et al patent for disabling the milker control system sufficiently long to allow the teat cups 14 to be placed on the cow's udder 16 and to permit the milking operation to achieve steady state condition. Consequently, when the switch 104 is momentarily tripped by the operator in the course of applying the teat cups 14, the milker support control of the invention herein and, specifically, the timer 90, will be reset. Thereafter, once the milking operation has been initiated, the switch 102 may be momentarily closed to set the flip-flop 68 to thereby initiate the support control cycle. In this respect, it will be observed that once the flip-flop 68 is set, an enabling signal is applied to the gate 62 as mentioned previously.

The output terminal of the timer 90 is also connected through a resistor to a light-emitting diode 110 to the driver 60. By reason of this connection, during the envelope generated by the timer 90, the light-emitting diode 110 will conduct whenever the solenoid 42 of the valve 40 is energized to thereby provide a visual signal for test purposes.

A further connection from the output terminal of the timer 90 is taken to a NOR gate 112 along with an input from the gate 64. The NOR gate 112 includes a connection to a transistor 114 which has its collector returned through a resistor 116 to the light-emitting diode 110, as illustrated. An additional connection from the collector is through a resistor 117 to the indictor 52. The base of the transistor 114 is connected to a conventional pulsing unit 118. The arrangement is such that when the flip-flop 68 is set and the envelope generated by the time 90 has elapsed, the indicator 52 will be flashed to provide an indication that the milking operation is terminated.

In general, the length of the envelope generated by the timer 90 will be preset for a time just slightly longer than the usual milking time for an average cow in the herd. Occasionally, the envelope will not be of sufficiently long duration to fully milk out a large cow. To this end, a manually operable switch 122 is provided and is connected between ground and a voltge divider, generally designated 124, connected to the control voltage terminal of the timer 90. If an operator of the system perceives that the envelope should be extended for a large cow, as mentioned previously, the switch 122 may be closed, thereby altering control voltage applied to the timer 90, with the result that a longer envelope will be generated. Once the large cow has been milked out, the switch 122 may then be opened and the system will revert to its normal condition. In this way, optimum system parameters may be preset on the system and may be altered individually as the need arises without extensive adjustment.

Upon de-energization of the pulse generator defined by the timer 70 at the end of the envelope, some intermediate will remain on the capacitor 76. If the capacitor 76 were allowed to remain only partly charged, upon initiation of the next succeeding cycle, the first downward step of the support would occur earlier than desired. Accordingly, the junction of the capacitor 76 and the resistive network, including the potentiometer 78, is returned through first and second diodes 130 and 132 to the switch 102. A resistor 134 is also included in the line to prevent damage to switch contacts or circuit components. Thus, when the switch 102 is momentarily closed to initiate a milking operation, the capacitor 76 will be fully charged to initialize the pulse generator defined by the timer 70.

Often, it is desirable that the initiation of the generation of the positive going pulses by the pulse generator 70 be delayed at the beginning of a milking operation so as to allow the milking operation to achieve steady state conditions. To achieve this result, a capacitor 136 is connected to the junction of the diodes 130 and 132 and to the source of power for the capacitor 76. It will be immediately recognized that the capacitor 136 can be charged only through the switch 102. Thus, when the switch 102 is momentarily closed to start a milking operation, both the capacitors 76 and 136 will be charged and both will begin to discharge as soon as the switch 102 is released. Because two capacitors are employed, the time required to initiate the pulse generation will be delayed. On the other hand, once circuit operation is initiated, the presence of capacitor 136 will not affect the length of time between pulses since it cannot be charged until such time as the switch 102 is again momentarily closed.

To insure that the circuit is reset when power is initially applied thereto, a capacitor 138 is connected between ground and the junction of two diodes 140 and 142, the latter being connected to an input to the gate 66. When power is removed, the capacitor 138 is discharged through the diode 140. Upon the application of power, the capacitor 138 charges through the diode 142 applying a positive signal to the gate 66 thereby resetting the circuit.

From the foregoing, it will be seen that a milker support system made according to the invention achieves the foregong objects in terms of providing a reliable means whereby the claw of a milking machine is progressively lowered during a milking operation to compensate for decreasing tautness of a cow's udder during the milking period. Accordingly, efficiency of the milking operation is maximized through use of the invention.

We claim:
1. A milker support comprising:
    means adapted to be located in a cow milking area for supporting a milking unit therein beneath a cow to be milked;
    means mounting said supporting means for movement to permit a milking unit thereon to be progressively lowered during the milking of a cow;
    means associated with one of said mounting means and said supporting means for moving said supporting means downwardly;
    control means for said moving means for causing said moving means to progressively lower said supporting means throughout a milking operation to adjust the position of a milking unit thereon to compensate for decreasing tautness in a cow's udder as a cow is milked out, whereby optimum tug and pull of the milker unit is achieved throughout a milking operation; and
    supporting means raising means whereby said supporting means can be moved upwardly to condition said milker support for a subsequent milking operation.
2. A milker support according to claim 1 wherein said moving means and supporting means raising means comprise a bidirectional motor.
3. A milker support according to claim 1 wherein said motor comprises a fluid actuated cylinder, a control valve in fluid communication with said cylinder, and said control means is operative to cyclically open and close said control valve to cause said cylinder to progressively lower said supporting means in step-wise fashion at predetermined intervals.

4. A milker support comprising:
a support structure adapted to be located in a milking stall for supporting a milking claw therein;
motor means including a reciprocal output structure connected to said support structure for imparting bidirectional movement in a vertical direction to said support structure;
manually operable control means for said motor means and operable to cause the same to elevate or lower said support structure to permit selective adjustment of the height of a milking claw thereon to achieve an optimum height for a given cow to be milked; and
automatic control means for said motor means for causing said motor means to progressively lower said support structure throughout a milking operation at a predetermined rate to maintain the milking claw at optimum milking heights as a cow is milked out.

5. A milker support according to claim 4 wherein said automatic control means includes means for periodically energizing said motor means for short periods of time to cause said support structure to be lowered in step-wise fashion.

6. A milker support according to claim 5 wherein said motor means includes a double acting fluid cylinder and said manually operable means comprises valve means in fluid communication with said cylinder and adapted to be connected to a source of fluid under pressure; and said automatic control means includes an electrically operable valve in fluid communication with one of said valve means and said cylinder, an electrical driver for said valve, and a pulsing timer for cyclically actuating said driver.

7. A milker support comprising:
a support structure adapted to be located in a milking stall for supporting a milking claw therein;
motor means including a reciprocal output structure connected to said support structure for imparting bidirectional movement in a vertical direction to said support structure;
manually operable control means for said motor means and operable to cause the same to elevate or lower said support structure to permit selective adjustment of the height of a milking claw thereon to achieve an optimum height for a given cow to be milked; and
automatic control means for said motor means for causing said motor means to progressively lower said support structure during a milking operation at a predetermined rate to maintain the milking claw at optimum milking heights as a cow is milked out, said control means including an envelope timer for settng the length of a milking operation, means for initiating operation of said envelope timer, a pulse generator for generating pulses to said motor means for causing said progressive lowering of said support means in a stepwise fashion; and means responsive to said envelope timer for enabling said pulse generator during operation of said envelope timer.

8. The milker support of claim 7 further including means manually and selectively operable during a milking operation for causing said envelope timer to extend the setting of the length of the milking operation then in progress.

9. The milker support of claim 7 wherein said pulse generator comprises an electronic circuit incuding an RC system, said RC system including a first adjustable resistive component for setting the interval between said pulses and a second adjustable resistive component for setting pulse width whereby frequency and duration of operation of said motor means during a milking operation may be selectively varied.

10. The milker support of claim 9 wherein said RC system incudes a timing capacitor and further incuding a further capacitor in series with a diode connected across said timing capacitor, said initiating means including a momentarily operable switch connected through a current-limiting resistor and isolation diode to both said capacitors, whereby when said switch is momentarily operated to initiate operation of said envelope timer, both said capacitors will be charged to initialize said RC system, said further capacitor acting to delay generation of the first pulse by said pulse generator to allow a milking operation to achieve a steady state condition before the progressive lowering of said support is initiated.

* * * * *

UNITED STATES PATENT AND TRADEMARK OFFICE
CERTIFICATE OF CORRECTION

PATENT NO. : 3,999,518
DATED : December 28, 1976
INVENTOR(S) : Lyle L. Needham, Harold V. Swanson, Don W. Fitzpatrick, James W. Kopec It is certified that error appears in the above-identified patent and that said Letters Patent are hereby corrected as shown below:

[73] Assignee: change "Babson Brothers Company to

-- Babson Bros. Co. --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*